(No Model.)
S. H. BROWN & L. SIBLEY.
CENTERING AND HOLDING DEVICE FOR TIRES.
No. 325,315. Patented Sept. 1, 1885.
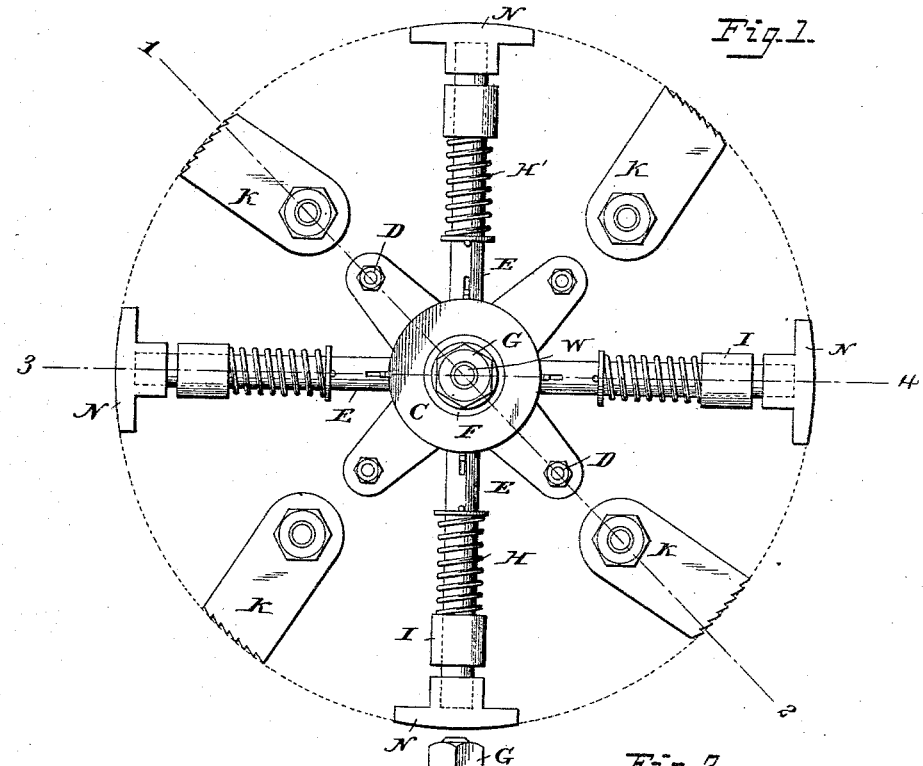
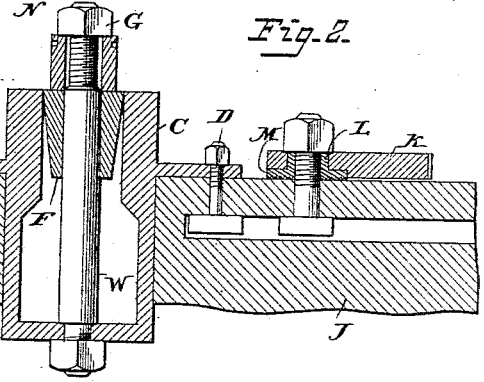
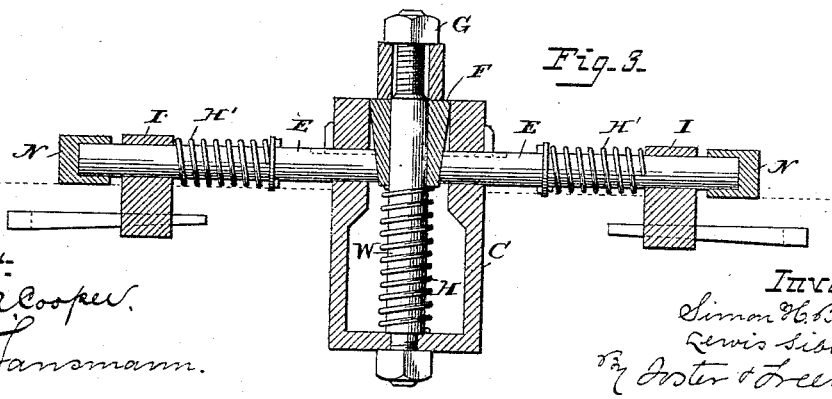

UNITED STATES PATENT OFFICE.

SIMON H. BROWN AND LEWIS SIBLEY, OF RAMAPO, NEW YORK.

CENTERING AND HOLDING DEVICE FOR TIRES.

SPECIFICATION forming part of Letters Patent No. 325,315, dated September 1, 1885.

Application filed June 30, 1885. (No model.)

*To all whom it may concern:*

Be it known that we, SIMON H. BROWN and LEWIS SIBLEY, citizens of the United States, residing at Ramapo, in the county of Rockland and State of New York, have invented certain new and useful Improvements in Centering and Holding Tires, of which the following is a specification.

Our invention is a device for centering and holding, while being finished, the steel tires of car-wheels, which, as ordinarily constructed, have internal flanges, and cannot be perfectly centered by the use of ordinary centering devices, our said device consisting of certain radially-adjustable centering-rods, vertical adjustable cone, and biting-dogs, as fully set forth hereinafter, and as illustrated in the accompanying drawings, in which—

Figure 1 is a plan view of our improved device; Fig. 2, a section on the line 1 2, Fig. 1; Fig. 3, a section on the line 3 4, Fig. 1.

Steel tires as sometimes made have internal flanges, which prevent the use of ordinary devices for centering them prior to the usual finishing operations. Our improved device is intended to center perfectly tires of this description. In the form shown in the drawings, C represents a hollow center piece fitted and kept in place by four bolts, D, to the face-plate J of any ordinary tire-machine. The center piece, C, has four or more holes through its side, either round or square, in which are fitted four or more radiating steel rods, E, one end of each of which engages with the inside face of the tire to be centered, and the other end with the outer face of a steel cone, F. The cone is pressed down on the center piece by a nut, G, upon an axial shaft, W, thereby projecting outward the steel rods E, moving them all exactly the same distance from the center.

When the nut G is loosened, the cone F and the rods E are pressed back to their places by spiral springs H H', the former lifting the cone; and the latter pushing inward, the rods or a clutch on the nut G and cone F may connect them, so that the cone will rise with the nut. (See Fig. 2.) The outer ends of rods E pass through guides I, which are keyed or bolted securely to the face-plate of the machine, thereby holding them firmly, so that it is impossible for the tire when against them to move out of center.

Each rod E is provided with a steel shoe, N, which can be roughened where it is to make contact with the tire, and is to be put onto the rod when occasion requires. These shoes may be fitted to the end of the rods so as to be held by friction or otherwise. They may be removed for the purpose of roughening or changing their shape to fit different sizes and shapes of tires.

K represents four or more steel dogs, which are bolted to the face-plate J and swing on bushing L, surrounding the bolts, and rest on washers M. The dogs have teeth or are roughened on the ends, and set so as to swing out of line with the center of machine, to engage with the inside or outside diameter of the tire to be finished, thereby holding it from turning around on the steel centering-rods E. The dogs K can be made in the form of cams, eccentrics, or any other convenient form, as necessity may require.

By the use of the above-described apparatus tires of any desired shape may be most accurately centered upon the face-plate during the operation of the rods E, and may be then firmly gripped, so as not to turn upon the plate by the action of the dogs.

The dogs may be arranged to bite upon the inside or outside of the tire, as may be most desirable.

The construction above set forth secures great firmness of parts and facility in operation and accuracy of adjustment without the aid of complex or expensive appliances.

Without limiting ourselves to the precise construction and arrangement of parts shown, we claim—

1. The combination of the base-plate J, hollow center piece, C, having radial openings and containing a vertically-adjustable cone, F, rods E, extending through said openings and bearing against the cone at their inner ends, and adjustable dogs K, all arranged to operate substantially as set forth.

2. The combination, with the plate J, of a hollow center piece, C, a shaft, W, within the latter threaded to receive a nut and supporting the vertically-adjustable cone F, centering-rods E, extending radially through openings in the center piece and through guides and bearing against the cone, and dogs K, pivoted to the face-plate J, substantially as set forth.

3. The combination, with the plate J, hollow center piece, adjustable cone, and radiating centering-rods extending through openings in the center piece, of springs H H', tending to force the cone outwardly and the rods inward against the cone, substantially as set forth.

4. The combination, with the radially-adjustable rods, of detachable shoes N, adapted to fit the end of the rods, substantially as and for the purpose set forth.

In testimony whereof we have signed our names to this specification in the presence of two subscribing witnesses.

SIMON H. BROWN.
LEWIS SIBLEY.

Witnesses:
J. LOUIS SUFFERN,
WILLIAM W. SNOW.